United States Patent
Stenchikova et al.

(10) Patent No.: US 8,832,064 B2
(45) Date of Patent: Sep. 9, 2014

(54) ANSWER DETERMINATION FOR NATURAL LANGUAGE QUESTIONING

(75) Inventors: Svetlana Stenchikova, Lake Grove, NY (US); Gokhan Tur, Castro Valley, CA (US); Dilek Hakkani Tur, Castro Valley, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 214 days.

(21) Appl. No.: 11/319,188

(22) Filed: Dec. 28, 2005

(65) Prior Publication Data

US 2007/0136246 A1 Jun. 14, 2007

Related U.S. Application Data

(60) Provisional application No. 60/740,632, filed on Nov. 30, 2005.

(51) Int. Cl.
*G06F 7/00* (2006.01)
*G06F 17/30* (2006.01)
*G06F 17/27* (2006.01)

(52) U.S. Cl.
CPC ........ *G06F 17/279* (2013.01); *G06F 17/30657* (2013.01)
USPC ............................ 707/708; 707/739; 707/771

(58) Field of Classification Search
USPC .......................................... 707/708, 739, 771
See application file for complete search history.

(56) References Cited

U.S. PATENT DOCUMENTS

| | | | |
|---|---|---|---|
| 5,715,445 A * | 2/1998 | Wolfe | 707/5 |
| 6,377,944 B1 * | 4/2002 | Busey et al. | 707/3 |
| 6,404,877 B1 | 6/2002 | Bolduc et al. | |
| 6,665,666 B1 * | 12/2003 | Brown et al. | 1/1 |
| 6,754,181 B1 | 6/2004 | Elliott et al. | |
| 6,813,341 B1 | 11/2004 | Mahoney | |
| 6,859,776 B1 | 2/2005 | Cohen et al. | |
| 7,027,974 B1 * | 4/2006 | Busch et al. | 704/4 |
| 2002/0023144 A1 * | 2/2002 | Linyard et al. | 709/218 |
| 2002/0129015 A1 * | 9/2002 | Caudill et al. | 707/6 |
| 2003/0004706 A1 * | 1/2003 | Yale et al. | 704/9 |
| 2004/0117352 A1 * | 6/2004 | Schabes et al. | 707/3 |
| 2006/0053000 A1 * | 3/2006 | Moldovan et al. | 704/9 |
| 2006/0204945 A1 * | 9/2006 | Masuichi et al. | 434/322 |

OTHER PUBLICATIONS

Bucholz, S. and Daelemans, W., "SHAPAQA: Shallow Parsing for Question Answering on the World Wide Web," Proceedings. Euroconference Recent Advances in Natural Language Processing (RANLP 2001) pp. 47-51.

Dumais, S., Banko, M., Brill, E., Lin, J.,and Ng, A., "Web Question Answering: Is More Always Better?," 8 pages.

(Continued)

*Primary Examiner* — Mariela Reyes

(57) ABSTRACT

Open-domain question answering is the task of finding a concise answer to a natural language question using a large domain, such as the Internet. The use of a semantic role labeling approach to the extraction of the answers to an open domain factoid (Who/When/What/Where) natural language question that contains a predicate is described. Semantic role labeling identifies predicates and semantic argument phrases in the natural language question and the candidate sentences. When searching for an answer to a natural language question, the missing argument in the question is matched using semantic parses of the candidate answers. Such a technique may improve the accuracy of a question answering system and may decrease the length of answers for enabling voice interface to a question answering system.

19 Claims, 7 Drawing Sheets

(56) References Cited

OTHER PUBLICATIONS

Radev, D., Fan, W., Qi, H., Wu, H., and Grewal, A., "Probabilistic Question Answering on the Web," 12 pages.

Tur, G., Hakkani-Tür, D., and Schapire, R., "Combining active and semi-supervised learning for spoken language understanding," Speech Communication 45 (2005) pp. 171-186.

Grois, E., "Learning Strategies for Open-Domain Natural Language Question Answering," Proceedings of the ACL Student Research Workshop, pp. 85-90.

Katz, B. and Lin, J., "Selectively Using Relations to Improve Precision in Question Answering," 8 pgs.

Li, X. and Roth, D., "Learning Question Classifiers," 7 pgs.

Moldovan, D., Harabagiu, S., Girju, R., Morarescu, P., Lacatusu, F., Novischi, A., Badulescu, A., and Bolohan, O., "LCC Tools for Question Answering," pp. 1-10.

Palmer, M. and Gildea, D., The Proposition Bank: An Annotated Corpus of Semantic Roles, pp. 1-33.

Pradhan, S., Ward, W., Hacioglu, K., Martin, J., and Jurafsky, D., "Semantic Role Labeling Using Different Syntactic Views," Proceedings of the 43rd Annual Meeting of the ACL, pp. 581-588, Jun. 2005.

Ravichandran, D. and Hovy, E., "Learning Surface Text Patterns for a Question Answering System," in Proceedings of the ACL Conference, 2002, 7 pgs.

Buchholz, S., Veenstra, J., and Daelemans, W., "Cascaded Grammatical Relation Assignment," 8 pgs.

Narayanan, S. and Harabagiu, S., "Question Answering Based on Semantic Structures," 9 pgs.

Surdeanu, M., Harabagiu, S., Williams, J., and Aarseth, P., "Using Predicate-Argument Structures for Information Extraction," 8 pgs.

Voorhees, E. and Harman, D., "Overview of TREC 2001," 15 pgs.

Voorhees, E., "Overview of TREC 2002," 16 pgs.

Voorhees, E., "Overview of TREC 2003," 25 pgs.

Hovey et al., "Using Knowledge to Facilitate Factoid Answer Pinpointing" Proceedings of the 19th Coling Conference, [Online] 2002, XP002446627; http://isi.edu/natural-language/people/ravichan/papers/coling-hovyetal.pdf; retrieved Aug. 13, 2007.

Echihabi et al., "Multiple-Engine question Answering in TextMap," Proceedings of TreC2003 Conference, [Online] 2003, XP002446628; http://www.isi.edu/natural-language/people/ravichan/papers/textmap-trec2003-notebook.pdf; retrieved Aug. 13, 2007.

Schone et al., "Question Answering with Qactis at Trec-2004," The Thirteenth Text Retrieval Conference (Tree 2004), [Online] Nov. 16, 2004; http://www.trec.nist.gov/pubs/trec13/papers/nsa-schone.qa.pdf.

Pozo et al., "Assignment of Semantic Roles Based on Word Sense Disambiguation," Advances in Artificial Intelligence—Iberamia 2004, [Online] 2004, XP002446632; http://www.springerlink.com/content/r0a7y8ec1418vr0y/>; retrieved Aug. 13, 2007.

Kai-Uwe Carstensen, "Frame-Antwort-Systeme," Universitat Freiburg, [Online] Jun. 21, 2005, XP002446630; http:www.ifi.unizh.ch/CL/carstens/Materialien/CarstensenNatS1QAS.pdf; retrieved Aug. 13, 2007.

* cited by examiner

ANSWER DETERMINATION FOR NATURAL LANGUAGE QUESTIONING

This application claims priority to provisional U.S. application Ser. No. 60/740,632, filed Nov. 30, 2005, having the title "SEMANTIC ROLE LABELING FOR QUESTION ANSWERING," herein incorporated by reference in its entirety for all purposes.

FIELD OF THE INVENTION

The invention relates generally to communication systems. More specifically, the invention relates to finding factoid answers to natural language questions within an electronic operating environment.

BACKGROUND

As the use of computers has increased in the work environment as well as home, the demand for faster and more accurate information has followed. Users want information at their fingertips and they want the information to be correct the first time. However, with the introduction and boom of the Internet, users can be overwhelmed in information, much of it highly irrelevant. A user is then left with the task of finding the proverbial needle in the haystack of information they seek.

Search engines have become one tool for discriminating mounds of information. Conventional systems allow a user to enter keywords, and the engines search the vast amounts of data to find corresponding results. The results may be based upon the frequency that other users access that data or it may be based upon the approximated correlation between the keyword(s) searched and the different data. In short, search engines provide a means for narrowing the amount of data a user must review.

Some specific types of search engines allow a user to answer specific questions. For example, the web site "Ask Jeeves," by Ask Jeeves, Inc. of Oakland, Calif., allows a user to type in a question and the system will perform a search and retrieval function to attempt to find an answer to the question. In operation, such a web site takes an input question of a user, such as "What is the capital of California?," searches the Internet, and retrieves web pages that may include the answer to the question. As part of the retrieval process, an introduction portion of the web site may be included on a results page. However, a concise answer is not provided alone. The answer is provided within link to a web site. In addition, numerous irrelevant links to web pages are retrieved, requiring a user to wade through the data and perform her personal determination of the answer.

SUMMARY

Question answering (QA) is the task of finding a concise answer to a Natural Language question. Question answering systems use a search engine but differ from a web search task by the type of its input and output. Input to a search engine is a query while a QA system takes a natural language question as an input. For example, if a user wants to find out, "Who first broke the sound barrier?", the user of a search engine would convert the question into a query like first AND broke AND "sound barrier," while the user of a QA system would type or say the question. The output of the QA system is a concise answer: Yeager, in the case of the above question while the search engine produces snippets with link to the web pages.

Providing a concise and accurate answer to a natural language question allows a user to retrieve an answer and continue with her work more efficiently. Semantic role labeling of a natural language factoid question allows for such a result. In accordance with aspects of the present invention, semantic role labeling is applied to the QA task for factoid questions, answers to a factoid question being a single word or a short phrase. For a baseline system approach, the traditional QA system modular architecture consisting of question classification, query generation, search, answer extraction, and re-ranking may be utilized.

This Summary is provided to introduce a selection of concepts in a simplified form that is further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The following detailed description of illustrative embodiments is better understood when read in conjunction with the accompanying drawings, which are included by way of example, and not by way of limitation with regard to the claimed invention.

DETAILED DESCRIPTION

Figure 1:
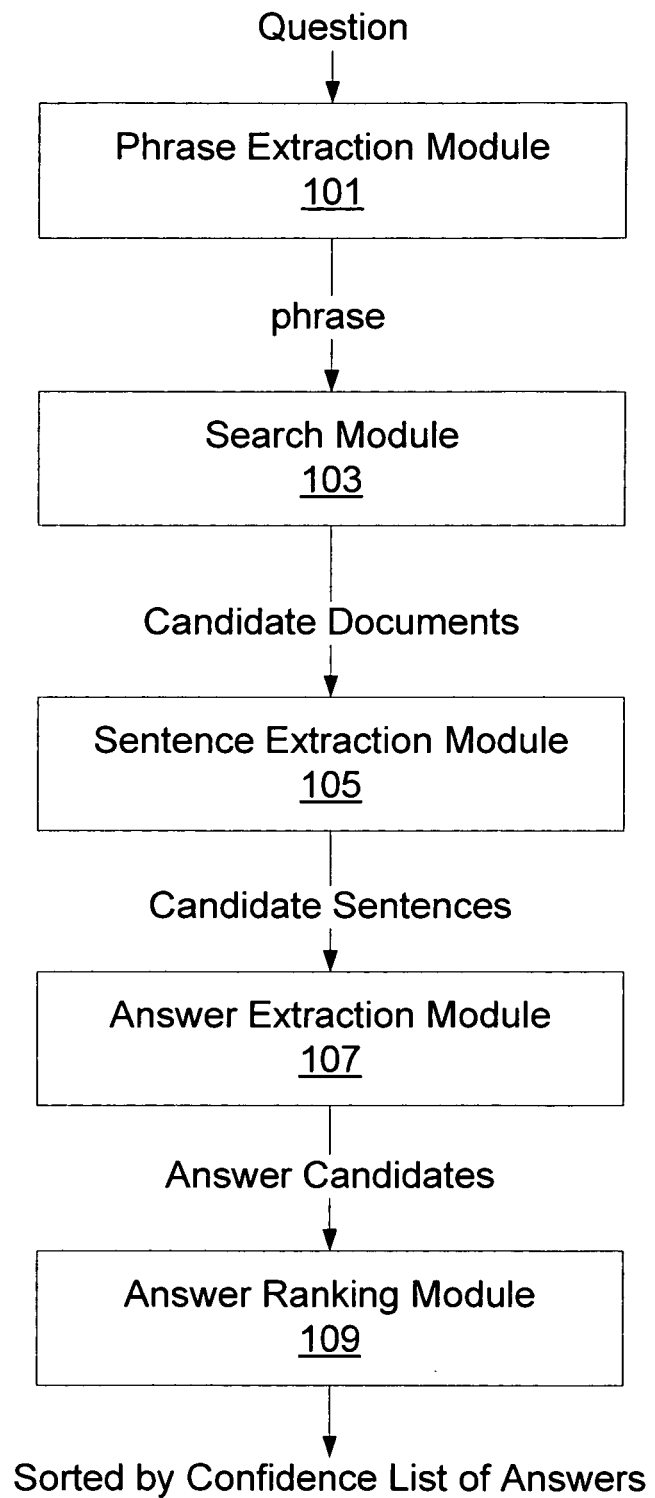
FIG. 1 illustrates an example block diagram of a Baseline system architecture in accordance with at least one aspect of the present invention.

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

In accordance with at least one aspect of the present invention, a system may comprise one or more memories configured to store computer readable instructions as described herein. These memories are computer-readable media having computer-executable commands for performing one or more methods. In one or more configurations, these computer readable instructions may be software modules. In addition, the system may further comprise one or more processors configured to execute the computer readable instructions stored on the one or more memories. In one or more configurations of the present invention, a computer may be used to implement one or more aspects of the present invention as described herein.

In accordance with at least one aspect of the present invention, semantic role labeling aims to identify the predicate/argument relations within a sentence. In accordance with aspects of the present invention, question and candidate sentences extracted using a search engine are processed to identify predicate/argument structure. In accordance with one embodiment, the semantic role labeler described in Pradhan et al., *Semantic Role Labeling Using Different Syntactic Views*, In Proceedings of the Association for Computational Linguistics 43rd annual meeting (ACL-2005) may be used. However, it should be understood by those skilled in the art that the present invention is not so limited to any one semantic role labeler and that any number of different semantic role labelers may be utilized in accordance with aspects of the present invention. As used herein, semantic role labeling refers to techniques for classifying word(s) or portions of a sentence into object and predicate designations. Those skilled in the art include individuals with an understanding of ontologies and semantic principles of languages.

Tags are assigned to predicates and argument phrases. For example, a TARGET tag is assigned to the predicate and ARG0, ARG1, ARG2 . . . , ARGM-TMP, and ARGM-LOC tags are assigned to arguments. The meaning of an argument type depends on a class of the predicate that it appears with, but generally ARG0 serves as an agent and ARG1, ARG2 . . . are objects. Arguments of the type ARGM-TMP, which represents temporal argument, and ARGM-LOC, which represents a location argument, are shared over all predicates.

Application of semantic role labeling may be seen in the following example. A sentence "Nostradamus was born in 1503 in the south of France" is tagged by a semantic role labeling program as [ARG1 Nostradamus] was [TARGET born] [ARGM-TMP in 1503] [ARGM-LOC in the south of France]. In this example, "born" is identified as a target predicate with three arguments, object "Nostradamus", temporal argument "in 1503," and location argument "in the south of France." The ability to extract the predicate-argument structure is a technique useful in many applications.

In accordance with aspects of the present invention, a question answering system that uses semantic role labeling is utilized and evaluated using a combination of automatic and manual evaluation on a set of Who/When/Where/What questions. The searched argument of the question is heuristically determined and this argument is extracted from the candidate sentences where the argument is applied to the matching predicate. To demonstrate the predicate/argument extraction for the QA task, consider a question "Who created a comic strip Garfield?" and a candidate sentence: "Garfield is a popular comic strip created by Jim Davis featuring the cat Garfield . . . . " Without deep semantic processing and finding predicate/argument relations, one could extract the answer "Jim Davis" by creating an example-specific template. However, it is not feasible to create templates for each anticipated predicate/answer candidate pair because the number of predicates covered by an open-domain question answering system is unlimited as well as the variation of candidate sentences.

With the knowledge of the predicate/argument structure identified by the semantic role labeler, the candidate sentence is tagged. For example, "Garfield is a popular comic strip created by Jim Davis featuring the cat Garfield . . . " becomes analyzed as Garfield is [ARG1 a popular comic strip] [TARGET created] [ARG0 by Jim Davis] featuring the cat Garfield . . . . In this example, ARG0 corresponds to the "agent," and the answer to the "who" question is expected to be an agent. Therefore, we can extract Jim Davis as the answer.

A predicate/argument extraction approach using semantic role labeling has been successfully applied to the task of spoken language understanding where predicate-argument extraction eliminates the need for the costly data labeling in the call-type classification system, achieving the performance close to the one of the manually labeled system. The method has successfully been applied to an Information Extraction task where, again, using predicate/argument extraction, the system's performance is close to the one using manually created patterns.

Some Question Answering system focus on using a fixed size document set to find answers, while others use the Internet as a resource. A fixed set of documents is generally more reliable and accurate, as one can choose which documents to use, but it often lacks redundancy. The Internet, in the alternative, lacks accuracy while providing a greater redundancy. Redundancy of the Internet information benefits a QA system because evaluation of the system occurs on a range of the number of snippets used for the answer extraction. Finding an answer in a small set of documents is a harder problem because the questions are less likely to appear in the form of the question phrase and it requires more careful analysis of the question and query generation in order to widen the range of potential answers in order to achieve a similar performance as using Internet data.

Some systems incorporate a combination of sophisticated NLP (natural language processing) techniques including syntactic parsing, named entity detection, lexical chains derived from extended WordNet ontologies, and logical prover. Predicate/argument identification in the question and the candidate answer improves the performance of the answers extraction module from the candidate sentences. A grammatic relations approach aims at the extraction of the answers from candidate sentences. Grammatic relations extraction may be based on the grammatic annotations from the Penn Treebank. Semantic roles in a sentence represent a predicate/argument structure while grammatic roles are an approximation to it.

Other systems match questions and answers on the level of syntactic relations. Their approach uses linguistically-uninformed techniques as a foundation of the Question Answering while sophisticated NLP processing is applied in the cases known to improve the performance. Linguistic phenomena that are difficult to handle for the linguistically-uninformed techniques have been identified. They are semantic symmetry and ambiguous modification.

Semantic symmetry occurs when the meaning of a sentence can not be derived using lexical information alone. For example, the sentences "The bird ate the snake" and "The snake ate the bird" are similar lexically as both of the nouns are animate objects. However, without knowing the syntactic information that the bird is the subject and the snake is the object, it is difficult to determine automatically who ate whom. Ambiguous modification occurs when it is difficult to determine which adjective is being modified. For example, in the sentence, "the planet's largest volcano," a system must be able to discern whether "largest" applies to the planet or to the volcano.

System Approach

In accordance with aspects of the present invention, the Internet is used as a data source for search and extraction of candidate documents. To find the candidate documents, a search engine, such as the search engine by Google™ of Mountain View, Calif., may be utilized. It should be understood by those skilled in the art that the present invention is not so limited to any particular search engine and that any number of different search engines for use with the Internet may be utilized. FIG. 1 illustrates an example block diagram of a Baseline system architecture in accordance with at least one aspect of the present invention. The stages of the system correspond to the different modules shown in FIG. 1. The work flow progresses from a natural language question to a phrase extraction module 101 to generate a phrase from the natural language question. An outputted phrase is used to extract documents by a search module 103. Outputted candidate sentences are found from the returned documents after proceeding through a sentence extraction module 105. Potential answers of the candidate sentences are then extracted from an answer extraction module 107. Finally, a list of the answer candidates is ranked by an answer ranking module 109. Illustrative examples of each of the different modules are described more fully below.

Phrase Generation

Figure 2:
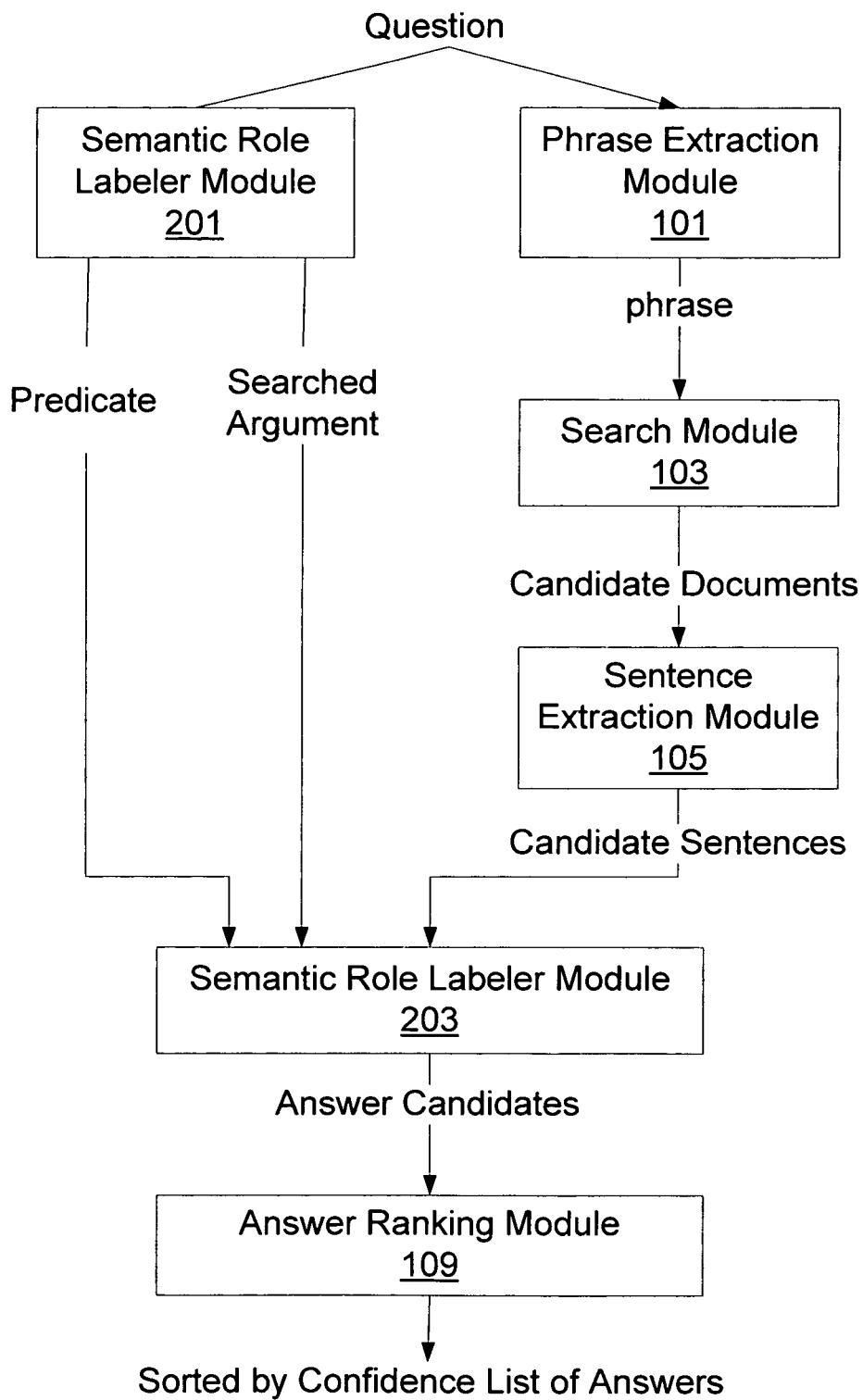
FIG. 2 illustrates an example block diagram of a question answering (QASR) system architecture in accordance with at least one aspect of the present invention.

In accordance with aspects of the present invention, a user inputs a natural language question into the system. Phrase generation module 101 may be configured to generate a phrase from the natural language question. The phrase generation module 101 then passes the phrase to a search module 103 for the document retrieval. FIG. 2 illustrates an example block diagram of a Question Answering (QASR) system architecture in accordance with at least one aspect of the present invention. The QASR system uses two techniques of phrase generation, exact phrase and conjunction of sub-phrases/inexact phrase. The two techniques of phrase generation may be parts of a cascaded approach. In one embodiment, the system may first attempt to find an answer using search results of an exact phrase technique. If an answer is not found from the exact phrase technique, an inexact phrase technique may then be utilized.

Exact Phrase Technique

For an exact phrase technique, the following illustrative heuristics may be utilized by the system. If a natural language question contains an auxiliary verb, such as is, was, were, are, did, do, or does, a phrase is generated by dropping all words between the 'wh' word and the auxiliary verb and matching the tense of the predicate with the auxiliary verb. For example, the natural language question, "When did Vesuvius last erupt?" yields a phrase, "Vesuvius last erupted," where the predicate "erupt" is changed to "erupted." For the example sentence, "What state does Martha Stewart live in?," a phrase, "Martha Stewart lives in" is yielded. The word "state," which appears between "What" and "does," is dropped. If the natural language question does not contain an auxiliary verb, a phrase is generated by dropping the 'wh' word. For example, the natural language question "Who invented the radio?," yields the exact phrase "invented the radio."

Conjunction of Sub-Phrases/Inexact Phrase Technique

For a conjunction of sub-phrases/inexact phrase technique, a phrase is generated from a natural language question using the output of a semantic role labeler, which identifies phrases as arguments of the predicate. The output of the semantic role labeler for the question, "Who invented the electric guitar?," is [ARG0 Who] [TARGET invented] [ARG1 the electric guitar]. The conjunction of the two identified phrases, except for the 'wh' word, "invented" and "the electric guitar" is used for the inexact search. If some words are not identified as phrases by the semantic role labeler, they may be added into conjunction as single words.

Search/Document Extraction

Search module 103 may be configured to operate using a conventional search engine, such as the Google™ search engine. One or more web-sites or databases may be filtered to avoid using other question answering web-sites. The search is done using an exact phrase technique and/or a conjunction of sub-phrases/inexact phrase technique. After the candidate documents are extracted, the documents are sent to the sentence extraction module 105 where the candidate documents are sentence split by a tool for extracting sentence split text from the web pages. AnswerBus by Zhiping Zheng and as found at http://www.answerbus.com/index.shtml provides such an example tool.

Candidate Sentence Extraction

Sentence extraction module 105 may utilize one of three methods of sentence extraction: exact phrase; conjunction of sub-phrases; or predicate. In the case of the exact phrase search, the candidate sentences are extracted with the exact phrase by scanning the candidate documents for the sentences with occurrences of the exact phrase. Predicate extraction may also be used by selecting all sentences containing the predicate. In the case of the inexact search, conjunction of the sub-phrases and predicate candidate sentence extraction may be utilized.

Answer Extraction

Baseline Approach

In the baseline approach, an answer is expected to appear on either side of the search phrase depending on the question type. For example, for the natural language question, "Who invented sillypuddy?," the phrase is, [ . . . ] "invented sillypuddy." In this example, the answer is expected to appear right before the phrase. All words from the beginning of the sentence are considered an answer. In this case, a sentence splitting algorithm may be utilized. Such a method is applicable to an exact search/phrase sentence extraction method.

Answer extraction module 107 filters out of all words that are "stop-words," such as he, she, and who. A shortened version is generated for every candidate answer by removing spaces, punctuation, and stop-words. Such a mechanism allows similar answers, like "Beatles" and "the Beatles," to be counted as the same answer. The confidence of an answer is a frequency of its shortened version with respect to all candidate answers. A threshold is used in the cascaded approach to eliminate the baseline answers with the confidence lower than the threshold. Answer ranking module 109 performs the corresponding ranking of answer candidates in accordance with any of a number of different ranking methods.

Semantic Role Approach

In accordance with one embodiment and the description in FIG. 2, semantic role labeler (SRL) modules 201 and 203 may be configured to replace the operation of answer extraction module 107. Both a natural language question and candidate answers are labeled by one or more semantic role labeler modules 201 and/or 203. Initially, the natural language question is parsed to find a predicate and the type of the argument of 'wh' word in the sentence. The accuracy of the SRL module 201 on the "wh" words may be limited and the labels of the "wh" words are not relied upon to determine the argument type of the candidate answer. Instead, a heuristics system for combining the type of the "wh" natural language question and question classification may be used. For example, in accordance with one embodiment of the present invention, the natural language question may be parsed as:

If the natural language question is a "Who" question, use ARG0 as the argument type. For example, "Who wrote Pride and Prejudice?," is parsed as [ARG0 Who] [TARGET wrote] [ARG1 War and Peace].

If the natural language question is a "When" question, use ARGM-TMP as the argument type. For example, "When was the Constitution ratified?," is parsed as [ARGM-TMP When] [TARGET was ratified] [ARG1 the Constitution].

If the natural language question is a "Where" question, use ARGM-LOC as the argument type. For example, "Where was Lincoln shot?," is parsed as [ARGM-LOC Where] [TARGET was shot] [ARG1 Lincoln].

If the natural language question is a "What" question and the Question Class is LOC, use ARGM-LOC as the argument type. For example, "What is the capital of Texas?," is parsed as [ARGM-LOC What] [TARGET is] [ARG1 the capital of Texas].

If the natural language question is a "What" question and the Question Class is "NUM_date", use ARGM-TMP as the argument type. For example, "What year was Grant born?," is parsed as [ARGM-TMP What] [TARGET was born] [ARG1 year].

If the natural language question is a "What" question, the Question Class is "HUM", and the natural language question contains did, do, or does, use ARG1 as the argument type. For example, "What actor did the jury nominate?," is parsed as [ARG1 What] [TARGET nominated] [ARG0 the jury].

If the natural language question is a "What" question, the Question Class is "HUM", and the natural language question does not contain did, do, or does, use ARG0 as the argument type. For example, "What actor received the prize?," is parsed as [ARG0 What] [TARGET received] [ARG1 the prize].

If the natural language question is a "What" question and the Question Class is ENTY, use ARG1 as the argument type. For example, "What do you call a professional map drawer?," is parsed as [ARG1 What] [TARGET is called] [ARG0 a professional map drawer].

If the natural language question is a "What" question and the Question Class is ABBR or DESC, use ARG2 as the argument type. For example, "What does DEC stand for?," is parsed as [ARG2 What] [TARGET stands for] [ARG0 DEC].

If the natural language question is a "What" question, the Question Class is UNMARKED, and the natural language question has state, city, or country, use ARGM-LOC as the argument type. For example, "What state is Boston in?," is parsed as [ARGM-LOC What] [TARGET is in] [ARG1 state].

In all other cases, use ARG0 as the argument type. For example, "What is 4 plus 4/," is parsed as [ARG0 What] [TARGET is] [ARG1 4 plus 4].

So, if a user enters a natural language question, "Who won the Nobel prize in literature in 1988?," semantic role labeler 201 outputs [ARG0 Who] [TARGET won] [ARG1 the nobel prize] in literature [ARGM-TMP in 1988]. "won" is identified as a predicate. Because the natural language question is identified as a "who" question, ARG0 is used as the argument type. When analyzing candidate sentences, semantic role labeler 203 identifies an ARG0 of the predicate "won."

The phrase, automatically extracted by the phrase extraction module 101 from the natural language sentence "won the Nobel prize in literature in 1988," is passed to the search module 103 to retrieve candidate documents. Candidate documents are sentence split in the sentence extraction module 105 and the sentences that contain all of the nonstop words from the phrase are considered as the candidate sentences containing the answer.

With respect to this example of "Who won the Nobel prize in literature in 1988?," the candidate sentences retrieved by search module may be:

"The veritable terrorism of which he is a target is unjustifiable, indefensible," wrote Naguib Mahfouz, the Egyptian who won the Nobel Prize in Literature in 1988.

Mahfouz, who won the Nobel Prize in Literature in 1988, is known for his intimate stories of Egyptian life. The Cairo Trilogy is his most celebrated work and his national prestige is absolute, like Victor Hugo is in nineteenth-century Paris.

Both of the candidate sentences contain the correct answer, Mahfouz. A baseline system fails to find the answer as it expects it to appear right before the search phrase. The word "who" is assumed to be the answer by the baseline system, but in this example, this is a stop word and the system returns no answer.

In accordance with aspects of the present invention, the candidate sentences are passed to the semantic role labeling module 203 which parses the sentences as:

"The veritable terrorism of which he is a target is unjustifiable, indefensible," wrote Naguib Mahfouz [ARG0 the Egyptian] [R-ARG0 who] [TARGET won] [ARG1 the Nobel Prize] [ARGM-LOC in Literature in 1988].

[ARG0 Mahfouz] [R-ARG0 who] [TARGET won] [ARG1 the Nobel Prize in Literature] [ARGM-TMP in 1988] is known for his intimate stories of Egyptian life. The Cairo Trilogy is his most celebrated work and his national prestige is absolute like Victor Hugo is in nineteenth-century Paris.

The two candidate answers identified are "the Egyptian" and "Mahfouz." Both of the answers are technically correct, although one of them is more specific and considered correct according to the answer patterns, that being "Mahfouz."

Cascaded Approach

Figure 3:
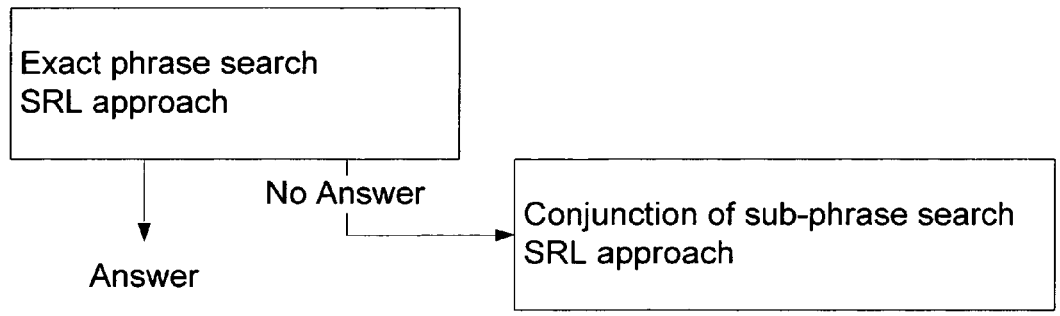
FIG. 3 an example block diagram of a 2-tier cascaded approach in accordance with at least one aspect of the present invention.

Aspects of the present invention provide a Semantic role labeling technique that may be applied to the candidate sentences. As necessary, a cascaded approach may be used of a combination of an exact phrase search with the phrase extraction and/or a conjunction of sub-phrases/inexact search with predicate sentence extraction. Algorithms may be combined using a cascaded approach to maximize the Mean Reciprocal Ranking (MRR) performance of the system by combining the higher precision/lower recall version of the algorithm, SRL on exact, with the lower precision/higher recall version, SRL on inexact. The cascaded approach is depicted in FIG. 3. First, an answer extraction algorithm on exact phrase search results is run. If 'no answer' is returned, an SRL algorithm on conjunction of sub-phrases/inexact search result is run.

Limited Domain Approach

Question Answering on a limited domain task assumes that the document set for question answering is fixed. This limits the question range as well as the redundancy of answer occurrences. At the same time, a limited domain allows for the preprocessing of the data offline. In the case of using the Internet as a domain, data processing, e.g., tagging and parsing, has to happen online on the selected sentences. Limited domain allows the processing of all sentences. Thus, candidate sentence selection is improved because now this decision is made using extra information.

Under a limited domain approach, the natural language question and the candidate documents are sentence split and all of the data is labeled with the semantic roles. A score is assigned for each sentence in the data set. If a predicate or any of its synonyms is not present in the candidate sentence, a score of 0 is assigned.

Aspects of the present invention utilize factoid type Who/When/Where/What natural language questions containing a predicate. The system uses absolute accuracy and Mean Reciprocal Ranking (MRR), where a system provides multiple (5) answers and each question receives a score equal to inverse of the correct answer's index or zero if correct answer is not found. An evaluation script and correct answer patterns may be provided with the data to automatically evaluate the system. The first automatically-marked-correct answers may be reviewed manually and the percentage of these answers that contains irrelevant information or is not grammatically correct may be computed. One motivation behind such an evaluation is for the voice enabled QA system where irrelevant and ungrammatical answers may decrease the user's comprehension even in the case of the correct answer. In order to select an algorithm for combining search methods, sentence and answer extraction techniques for each module of the system may be evaluated separately.

Search And Extraction

In one embodiment of the present invention, search result and sentence extraction are evaluated using pattern match of correct answers on the retrieved documents. Table 1 shows the results of one such example.

TABLE 1

Evaluation of the Search and Sentence Extraction methods: Proportion of number of sentences containing a correct answer/proportion of the question containing zero correct answers in the candidates

| | Search/Extraction | | | |
|---|---|---|---|---|
| | Search Result (phrase) | Sentence Extraction (conj. of subph) | Sentence Extraction (predicate) | Sentence Extraction |
| Exact phrase | 8419/76 | .30/.51 | n/a | 0.05/.46 |
| Conjunction of sub-phrases | 18814/43 | n/a | .18/.51 | 0.08/.35 |

This analysis detects that an exact phrase search technique using exact phrase extraction produces the highest precision, 30% of the candidate sentences contain the correct answer, but low recall, only 49% of the questions contain at least one correct answer in the candidate sentences. A conjunction of sub-phrases/inexact search technique with predicate method of sentence extraction has the highest recall, 69% of the candidate sentences contain a correct answer, but only 10% of all candidate sentences have a correct answer. These numbers correspond to the precision and recall of the system performance on exact/inexact search results discussed in the next section and serve as a motivation for the cascaded approach which combines higher precision/lower recall version of the algorithm, SRL on exact, with the lower precision/higher recall version, SRL on inexact.

System Performance Evaluation

The system is configurable for combining the two answer extraction algorithms, baseline and SRL, and the two document/sentence extraction methods, exact phrase and conjunction of sub-phrases/inexact phrase, in various ways. Table 2 presents a precision of correct answers and recall values for each of the systems. The precision of correct answers corresponds to the number of questions that have a correct answer in one of the five (5) top answers over the total questions answered. The recall corresponds to the number of questions answered over the total number of questions. The results show that a SRL system on the exactly matched candidates gives higher precision 0.84 and lower recall 0.44, while the SRL algorithm results in lower precision 0.42 and higher recall 0.82.

TABLE 2

Evaluation precision and recall: "corr prec" stands for the Precision of correct answers = number of questions that have a correct answers in one of the 5 top answers/total questions answered. Recall is the number of questions answered over the total number of questions

| A search | Baseline corr prec/recall | SRL corr prec/recall |
|---|---|---|
| Exact | 0.60/0.53 | 0.84/0.44 |
| Inexact | n/a | 0.42/0.8 |
| Exact + Inex | n/a | 0.53/0.82 |

Table 3 presents an example table of the Mean Reciprocal Ranking (MRR) and precision values for the Baseline system, SRL system on exact match, SRL system on inexact match, and the combination of SRL on exact and inexact matched candidate sentences. The combination of the SRL on Exact Search and Inexact search raises the MRR to 0.35, compared with the baseline of 0.24. Such an increase is due to two factors, the MRR of the SRL system on exact search candidates is higher than the MRR of the baseline system on the exact match candidates, and the SRL system has higher coverage because it also uses the inexact match candidates to retrieve the answers. The Baseline algorithm does not address the inexact candidates because these candidates do not contain a match phrase.

TABLE 3

Evaluation of the Search and Answer Extraction methods: MRR/precision. Cascaded approach combining baseline, SRL on exact and inexact searched sentences gives the best result MRR = 0.35

| /answer extr search | Baseline MRR/Prec. | SRL MRR/Prec. | Baseline + SRL MRR/Prec. |
|---|---|---|---|
| Exact | 0.24/0.19 | 0.29/0.24 | .026/0.2 |
| Inexact | n/a | 0.23/0.16 | n/a |
| Exact + Inex | n/a | .035/0.3 | 0.35/0.3 |

Figure 4:
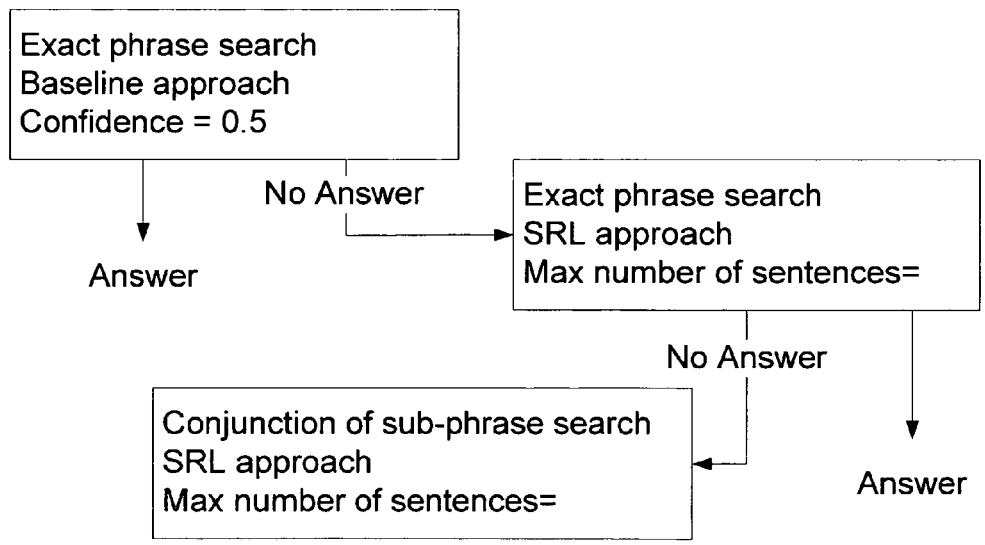
FIG. 4 is an example block diagram of a 3-tier cascaded approach in accordance with at least one aspect of the present invention.

In accordance with one embodiment, a 3-tier cascaded approach may be used as is illustrated in FIG. 4. The 3-tier cascaded approach includes running a baseline approach in combination with the SRL approach. The Baseline approach is the fastest as it does not require deep semantic processing of the candidate answers. Such a 3-tier cascade approach may produces a similar MRR and precision result to a 2-tier cascade approach as illustrated in FIG. 3 but it decreases the conciseness and precision of the correct answers described in the following section.

Answer Conciseness

The average length of the answers may be computed in the number of words. As shown in Table 4, the results show that an SRL approach decreases the average length of an answer from 9.1 to 4.5 words per answer. Comparing the correct answers of the Baseline and the SRL systems, it is found that in 26% of the first correct answers on the Baseline system, some information irrelevant to the question is contained. Information may be considered irrelevant if it does not correspond to the question asked. In addition, 17% of the first correct answers of the Baseline system are grammatically incorrect.

Under the SRL system, 7% of the first correct answers contain irrelevant information and 2% are grammatically incorrect. For example, the answer to a natural language question "Where was Tesla born?" using a Baseline system is "to Serbia parents in smiljan, croatia", and using SRL system is "in smiljan, croatia." A Baseline system's answer contains the correct pattern "Croatia" as well as some irrelevant information "to Serbia parents." This is not necessarily incorrect, but may affect the system performance when used via the voice interface. In this example, "smiljan" is not considered irrelevant as it is elaboration on the location. An example of a grammatically incorrect answer may be found from the natural language question, "Who painted Olimpia?" A Baseline's answer is "had Manet." Such a grammatically incorrect answer may affect user comprehension in the case of the voice enabled interface.

A Baseline system extracts part of a sentence next to the search phrase, which may contain the correct answer along with other irrelevant information. Truncation of a sentence does not necessarily produce a grammatically correct sentence, while if the semantic role parse is correct, a complete phrase should be identified and the final answer is more likely to be concise and grammatically correct. In addition to improving the automatically evaluated system performance, an SRL approach produces more concise and grammatically correct answers.

TABLE 4

Manual Evaluation of the Irrelevant Information, Ungrammatical Structure and Average Length of Correct Answers

| System | Baseline total 35 correct | SRL on exact total 44 correct |
|---|---|---|
| Contains irrelevant information | 0.26 | 0.07 |
| Not Grammatically correct | 0.17 | 0.02 |
| Average answer length (in words) | 9.1 | 4.5 |

Figure 5:
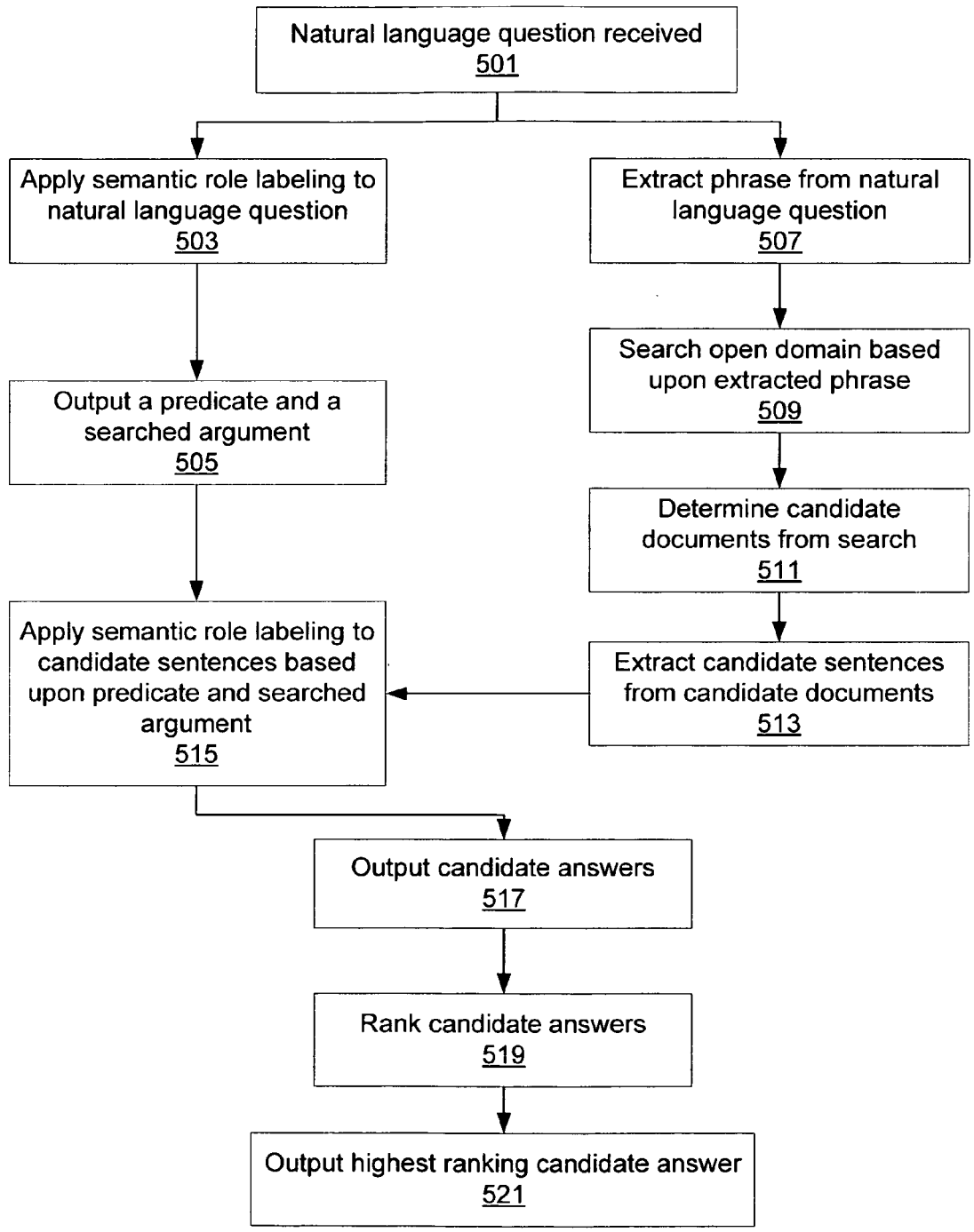
FIG. 5 is a flow chart of an illustrative example of a method for determining a factoid answer to a natural language question in accordance with at least one aspect of the present invention.

FIG. 5 is a flow chart of an illustrative example of a method for determining a factoid answer to a natural language question in accordance with at least one aspect of the present invention. The process starts at step 501 where a natural language question is received by the system. Proceeding to step 503, semantic role labeling in accordance with aspects of the present invention are applied to the natural language question and a predicate and searched argument are outputted at step 505 before the process proceeds to step 515.

Concurrent to step 503, at step 507, the natural language question is analyzed to extract a phrase. Proceeding to step 509, the extracted phrase is used as part of a search of an open domain source, such as the Internet. It should be understood that a fixed domain source may also be used and that the present invention is not so limited to an open domain source. At step 511, candidate documents are determined from the search and then candidate sentences are extracted from the candidate documents at step 513 before the process proceeds to step 515.

At step 515, semantic role labeling is applied to the candidate sentences based upon the predicate and the searched argument. Candidate answers are then outputted in step 517. An answer ranking module may then rank the candidate answers in step 519 based upon any of a number of different methods for ranking data. Finally, at step 521, the highest ranking candidate answer is outputted as the answer to the factoid natural language question.

Figure 6A:
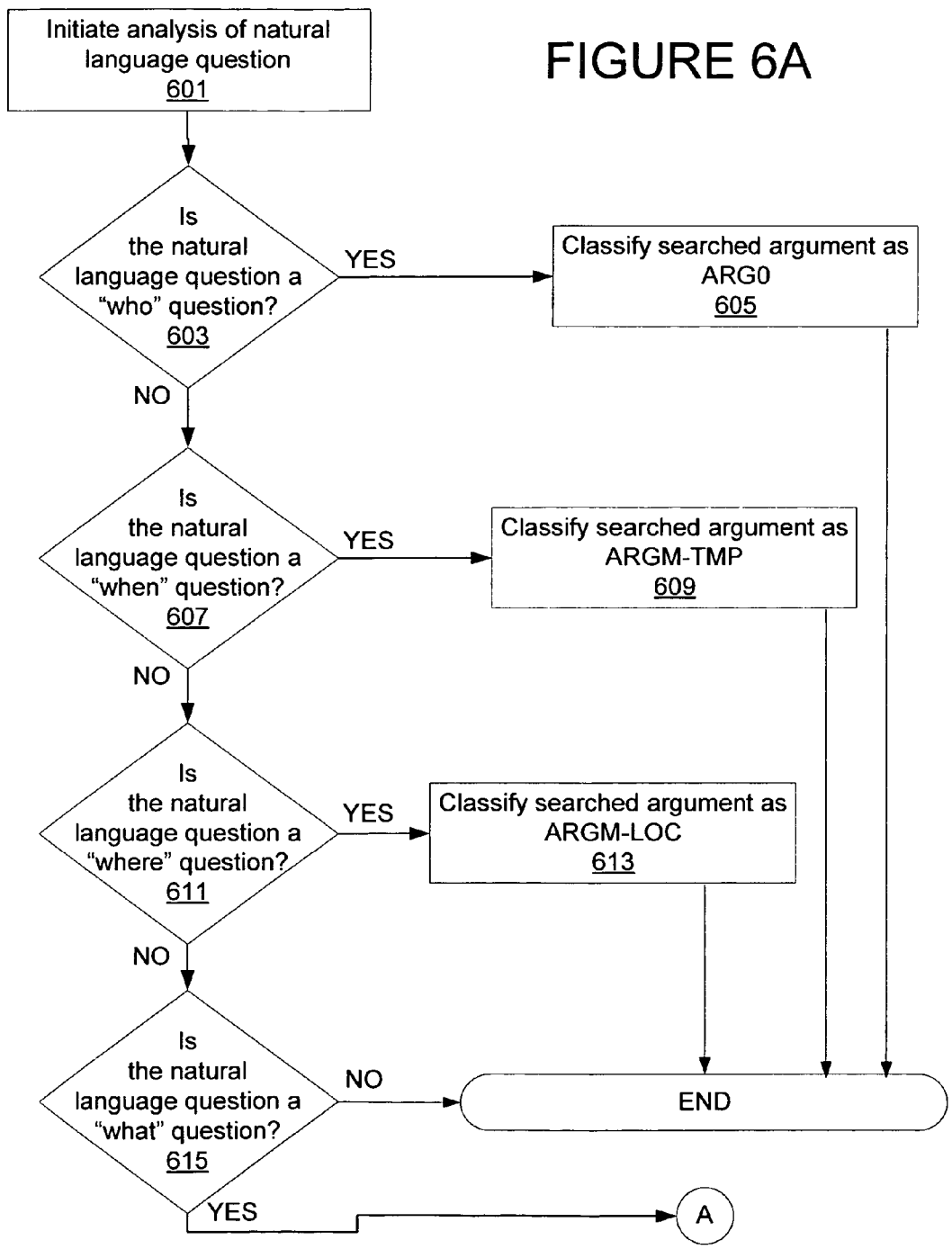
FIGS. 6A-6C are a flowchart of an illustrative example of a method for determining a searched argument classification corresponding to a natural language question in accordance with at least one aspect of the present invention.
Figure 6B:
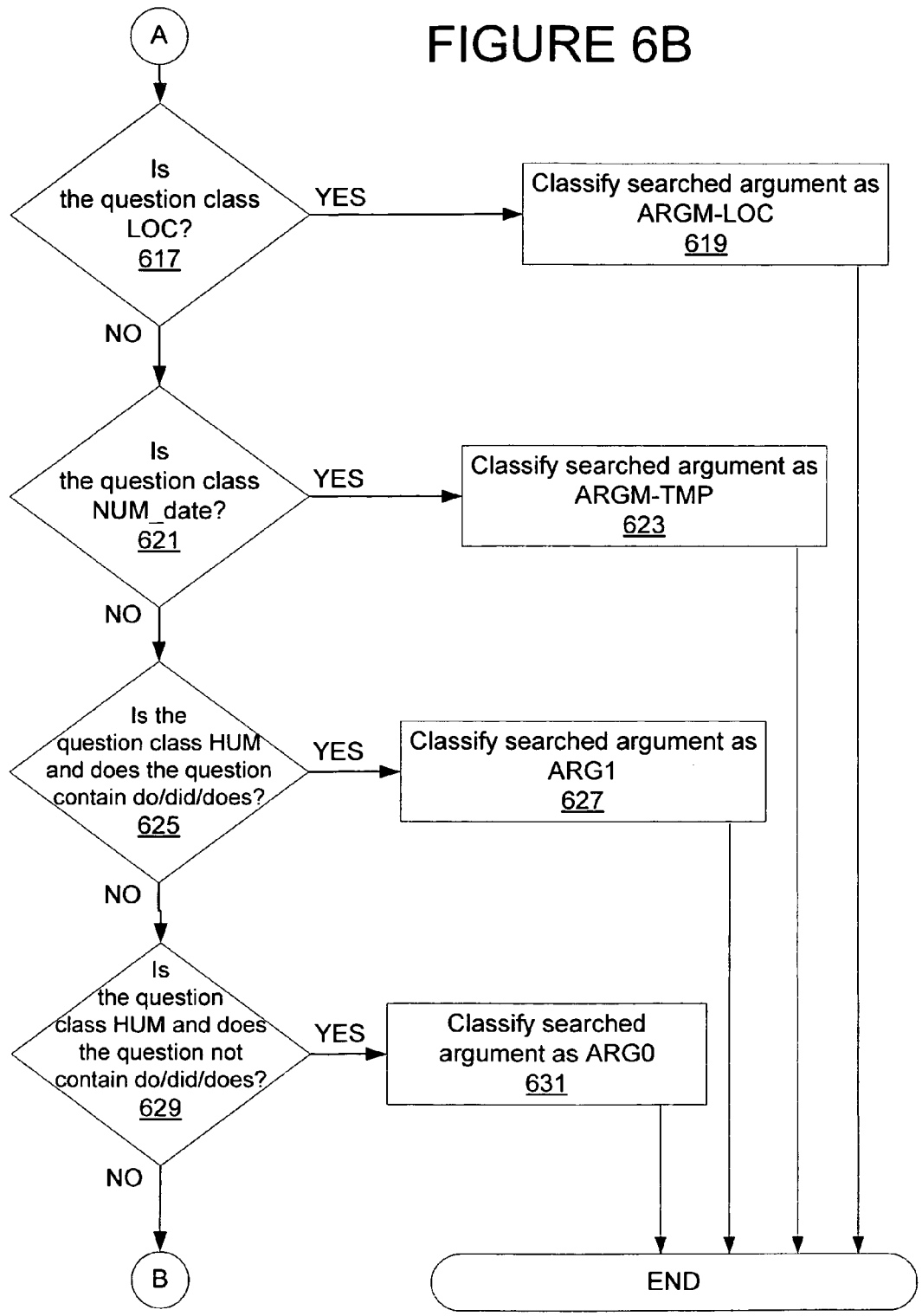
Figure 6C:
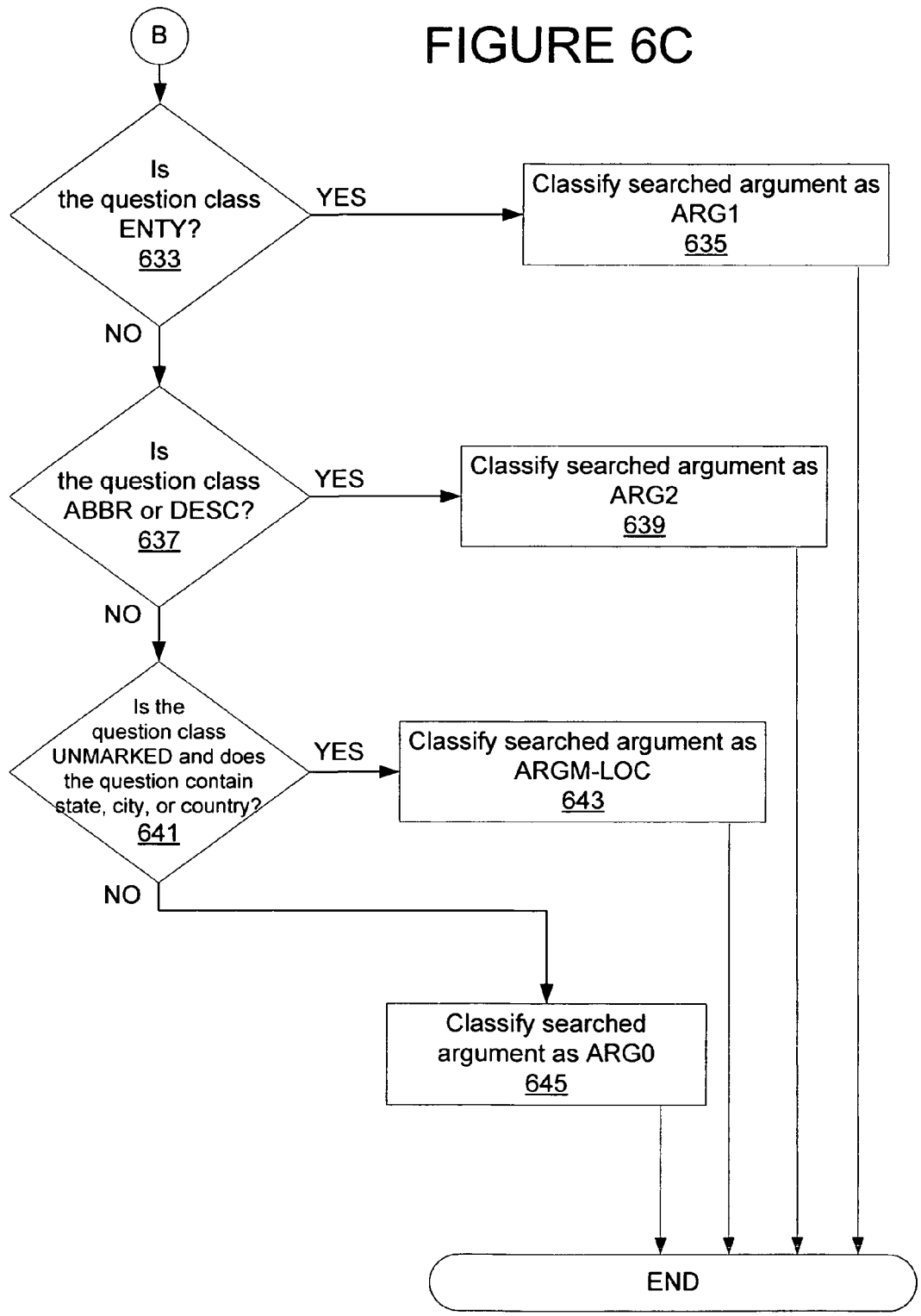

FIGS. 6A-6C are a flowchart of an illustrative example of a method for determining a searched argument classification corresponding to a natural language question in accordance with at least one aspect of the present invention. Aspects of the description of FIGS. 6A-6C may be utilized within step 503 of FIG. 5. As the process begins in FIG. 6A, at step 601, analysis of the natural language factoid question is initiated. A determination is then made at step 603 as to whether the natural language question is a "who" question, meaning, does the question begin with "who." If the natural language question is a "who" question, the process moves to step 605 where the search argument is classified as ARG0 and the process ends. If the natural language question is not a "who" question, the process proceeds to step 607.

At step 607, a determination is made as to whether the natural language question is a "when" question, meaning, does the question begin with "when." If the natural language question is a "when" question, the process moves to step 609 where the search argument is classified as ARGM-TMP and the process ends. If the natural language question is not a "when" question, the process proceeds to step 611. A determination is made at step 611 as to whether the natural language question is a "where" question, meaning, does the question begin with "where." If the natural language question is a "where" question, the process moves to step 613 where the search argument is classified as ARGM-LOC and the process ends. If the natural language question is not a "where" question, the process proceeds to step 615.

At step 615, a determination is made as to whether the natural language question is a "what" question, meaning, does the question begin with "what." If the natural language question is a "what" question, the process moves to step 617 as described in FIG. 6B. If the natural language question is not a "what" question, the process ends. As shown in FIG. 6B, at step 617, a determination is made as to whether the question class is identified as LOC, meaning does the "what" question seek a location answer. If the question class is LOC, the process proceeds to step 619 where the search argument is classified as ARGM-LOC and the process ends. If the question class is not LOC, the process proceeds to step 621.

At step 621, a determination is made as to whether the question class is identified as NUM_date, meaning does the "what" question seek a temporal answer. If the question class is NUM_date, the process proceeds to step 623 where the search argument is classified as ARGM-TMP and the process ends. If the question class is not NUM_date, the process proceeds to step 625. At step 625, a determination is made as to whether the question class is identified as HUM and does the question contain do, did, or does, meaning does the "what" question seek a human for an answer and is the verb do, did, or does. If the question class is HUM and the question does contain do, did, or does, the process proceeds to step 627 where the search argument is classified as ARG1 and the process ends. If the question class is not HUM and/or the question does not contain do, did, or does, the process proceeds to step 629.

At step 629, a determination is made as to whether the question class is identified as HUM and does the question not contain do, did, or does, meaning does the "what" question seek a human for an answer and is the verb something other than do, did, or does. If the question class is HUM and the question does not contain do, did, or does, the process proceeds to step 631 where the search argument is classified as ARG0 and the process ends. If the question class is not HUM and/or the question does contain do, did, or does, the process proceeds to step 633 as shown in FIG. 6C.

At step 633, a determination is made as to whether the question class is identified as ENTY, meaning does the "what" question seek an entity for an answer. If the question class is ENTY, the process proceeds to step 635 where the search argument is classified as ARG1 and the process ends. If the question class is not ENTY, the process proceeds to step 637. At step 637, a determination is made as to whether the question class is identified as ABBR or DESC, meaning does the "what" question seek an answer for an abbreviation of description. If the question class is ABBR or DESC, the process proceeds to step 639 where the search argument is classified as ARG2 and the process ends. If the question class is not ABBR or DESC, the process proceeds to step 641.

Proceeding to step 641, a determination is made as to whether the question class is identified as UNMARKED and whether the question contains state, city, or country, meaning does the "what" question seek a city, state, or country for an answer. If the question class is UNMARKED and the question contains state, city, or country, the process proceeds to step 643 where the search argument is classified as ARGM-LOC and the process ends. If the question class is not UNMARKED and/or the question does not contain state, city, or country, the process proceeds to step 645 where the search argument is classified as ARG0 before the process ends.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method comprising:
 receiving a natural language question from a user;
 generating a search phrase by:
  applying an exact phrase technique which retrieves an exact phrase from the received natural language question; and
  applying a conjunction technique which identifies a sub-phrase from the natural language question and conjoins the sub-phrase with the exact phrase as a predicate, to yield a search phrase that comprises a plurality of words in a non-stop order;
 identifying a plurality of candidate sentences based on the search phrase, wherein each candidate sentence in the plurality of candidate sentences contains the plurality of words in the non-stop order;
 evaluating the plurality of candidate sentences using a 3-tier cascaded approach, wherein the 3-tier cascaded approach utilizes a baseline approach in combination with a semantic role labeler approach, where the baseline approach is a first tier of the 3-tier cascaded approach, the semantic role labeler approach is a second tier of the 3-tier cascaded approach, and a conjunction of sub-phrase search which is a mixture of the baseline approach and the semantic role labeler approach is a third tier of the 3-tier cascaded approach, to yield a level of precision for each candidate sentence;
 when the level of precision of a candidate sentence meets a required threshold, generating a candidate answer by using a phrase sentence extraction approach to extract a portion from a side of the search phrase within the candidate sentence; and
 providing the candidate answer in response to the natural language question.

2. The method of claim 1, wherein identifying of the candidate sentences further comprises:
 scanning a plurality of documents for the search phrase.

3. The method of claim 1, wherein the candidate answer is one of a plurality of candidate answers, and further comprising ranking each candidate answer in the plurality of candidate answers by a confidence level.

4. The method of claim 3, wherein the candidate answer has a highest confidence level in the plurality of candidate answers.

5. The method of claim 1, wherein the conjunction of the sub-phrase with the exact phrase further comprises determining whether a predicate and a search argument are found within the natural language question.

6. The method of claim 5, wherein the search argument is classified as a location argument.

7. The method of claim 5, wherein the search argument is classified as a temporal argument.

8. The method of claim 1, wherein the natural language question comprises one of who, when, where, and what words.

9. The method of claim 1, wherein the exact phrase technique is based on dropping all words between a "wh" word and an auxiliary verb, comprising the "wh" word and the auxiliary verb, and matching a tense of a predicate verb in the natural language question with the auxiliary verb.

10. The method of claim 9, wherein the auxiliary verb comprises one of: is, was, are, did, do and does.

11. A computer-readable storage device having instructions stored which, when executed by a computing device, cause the computing device to perform operations comprising:
   receiving a natural language question from a user;
   generating a search phrase by:
      applying an exact phrase technique which retrieves an exact phrase from the received natural language question; and
      applying a conjunction technique which identifies a sub-phrase from the natural language question and conjoins the sub-phrase with the exact phrase as a predicate, to yield a search phrase that comprises a plurality of words in a non-stop order;
   identifying a plurality of candidate sentences based on the search phrase, wherein each candidate sentence in the plurality of candidate sentences contains the plurality of words in the non-stop order;
   evaluating the plurality of candidate sentences using a 3-tier cascaded approach, wherein the 3-tier cascaded approach utilizes a baseline approach in combination with a semantic role labeler approach, where the baseline approach is a first tier of the 3-tier cascaded approach, the semantic role labeler approach is a second tier of the 3-tier cascaded approach, and a conjunction of sub-phrase search which is a mixture of the baseline approach and the semantic role labeler approach is a third tier of the 3-tier cascaded approach, to yield a level of precision for each candidate sentence;
   when the level of precision of a candidate sentence meets a required threshold, generating a candidate answer by using a phrase sentence extraction approach to extract a portion from a side of the search phrase within the candidate sentence; and
   providing the candidate answer in response to the natural language question.

12. The computer-readable storage device of claim 11, wherein the natural language question comprises one of who, when, where, and what words.

13. The computer-readable storage device of claim 12, wherein when the natural language question contains an auxiliary verb, the search phrase is generated by dropping words between the auxiliary verb and the one of: who, when, where, and what words.

14. The computer-readable storage device of claim 13, wherein the auxiliary verb comprises one of: is, was, are, did, do, and does.

15. The computer-readable storage device of claim 11, wherein determining the candidate sentence comprises:

scanning a plurality of documents for an occurrence of the search phrase within a sentence.

16. A system comprising:
   a processor; and
   a memory having instructions stored which, when executed by the processor, cause the processor to perform operations comprising:
      receiving a natural language question from a user;
      generating a search phrase by:
         applying an exact phrase technique which retrieves an exact phrase from the received natural language question; and
         applying a conjunction technique which identifies a sub-phrase from the natural language question and conjoins the sub-phrase with the exact phrase as a predicate, to yield a search phrase that comprises a plurality of words in a non-stop order;
      identifying a plurality of candidate sentences based on the search phrase, wherein each candidate sentence in the plurality of candidate sentences contains the plurality of words in the non-stop order;
      evaluating the plurality of candidate sentences using a 3-tier cascaded approach, wherein the 3-tier cascaded approach utilizes a baseline approach in combination with a semantic role labeler approach, where the baseline approach is a first tier of the 3-tier cascaded approach, the semantic role labeler approach is a second tier of the 3-tier cascaded approach, and a conjunction of sub-phrase search which is a mixture of the baseline approach and the semantic role labeler approach is a third tier of the 3-tier cascaded approach, to yield a level of precision for each candidate sentence;
      when the level of precision of a candidate sentence meets a required threshold, generating a candidate answer by using a phrase sentence extraction approach to extract a portion from a side of the search phrase within the candidate sentence; and
      providing the candidate answer in response to the natural language question.

17. The system of claim 16, wherein identifying of the candidate sentences further comprises scanning a plurality of documents for the search phrase within a sentence and identifying a candidate document within a plurality of documents based on which document contains the search phrase in a sentence.

18. The system of claim 16, wherein the candidate document is obtained by searching a fixed document set for the candidate document.

19. The system of claim 16, wherein the natural language question comprises one of who, when, where, and what words.

* * * * *